(12) United States Patent
Wang et al.

(10) Patent No.: US 10,694,898 B2
(45) Date of Patent: Jun. 30, 2020

(54) SLIDING SEAT OF LIFTING ROD

(71) Applicants:Xiamen Lota International Co., Ltd., Xiamen, Fujian (CN); Lota Xiamen Industry Co., Ltd., Xiamen, Fujian (CN)

(72) Inventors: Xuedong Wang, Xiamen (CN); Jiangcheng Zhang, Xiamen (CN); Xiaofei Guo, Xiamen (CN)

(73) Assignees: XIAMEN LOTA INTERNATIONAL CO., LTD., Xiamen, Fujian (CN); LOTA XIAMEN INDUSTRY CO., LTD., Xiamen, Fujian (CN)

( * ) Notice: Subject to any disclaimer, the term of this patent is extended or adjusted under 35 U.S.C. 154(b) by 126 days.

(21) Appl. No.: 16/026,059

(22) Filed: Jul. 3, 2018

(65) Prior Publication Data

US 2019/0239700 A1    Aug. 8, 2019

(30) Foreign Application Priority Data

Feb. 6, 2018   (CN) .......................... 2018 1 0118620

(51) Int. Cl.
  *E03C 1/06*   (2006.01)
  *E03C 1/02*   (2006.01)
  *A47K 3/28*   (2006.01)
  *F16M 13/02*  (2006.01)
  *B05B 1/18*   (2006.01)

(52) U.S. Cl.
  CPC ................ *A47K 3/281* (2013.01); *E03C 1/06* (2013.01); *F16M 13/022* (2013.01); *B05B 1/18* (2013.01); *E03C 1/02* (2013.01)

(58) Field of Classification Search
  CPC .. A47K 3/281; E03C 1/06; E03C 1/02; F16M 13/022; B05B 1/18
  See application file for complete search history.

(56) References Cited

U.S. PATENT DOCUMENTS

| | | | |
|---|---|---|---|
| 7,407,140 B2 * | 8/2008 | Sen | ........................ E03C 1/066 239/283 |
| 9,382,699 B2 * | 7/2016 | Andersen | ................ E03C 1/066 |
| 10,232,386 B1 * | 3/2019 | Lu | .......................... E03C 1/0408 |
| 10,335,822 B1 * | 7/2019 | Shoemaker, Sr. | ......... B05B 1/18 |
| 2019/0345700 A1 * | 11/2019 | Davidson | ................ E03C 1/025 |

* cited by examiner

Primary Examiner — Tan Le
(74) Attorney, Agent, or Firm — Leong C. Lei

(57) ABSTRACT

A sliding seat of a lifting rod includes a main body, a movable member, a friction block, an elastic member, and a knob having a handle. The friction block is fitted at one end of a through passage of the main body close to a receiving hole and abuts against a side wall of the lifting rod. The movable member is fitted at another end of the through passage. The elastic member is fitted between the movable member and the friction block. The knob is rotatably fitted on the main body to movably cooperate with the movable member. A push structure is provided between the knob and the movable member. It is convenient to adjust the position of the main body on the lifting rod.

12 Claims, 5 Drawing Sheets

SLIDING SEAT OF LIFTING ROD

BACKGROUND OF THE INVENTION

1. Field of the Invention

The present invention relates to a bathroom accessory, and more particularly, to a sliding seat of a lifting rod.

2. Description of the Prior Art

In the field of sanitary ware, a movable sliding seat is provided on a lifting rod for retaining the shower head. By adjust the height of the sliding seat, the height of the shower head can be adjusted, which is convenient for people to use the shower head. The sliding seat is fitted on the lifting rod. The sliding seat has a holding mechanism therein for holding the lifting rod so that the sliding seat can be retained at a certain height of the lifting rod. When the holding state of the holding mechanism is released, the sliding seat can be moved on the lifting rod to adjust the height of the sliding seat. The releasing and holding of the holding mechanism of the sliding seat relative to the lifting rod is generally controlled by means of a button, which requires a relatively large operation force to operate the holding mechanism of the sliding seat. During the movement of the sliding seat, the operation force must be maintained at all times. It is inconvenient for the user to operate holding mechanism. It is not easy to fix the sliding seat at a desired position.

SUMMARY OF THE INVENTION

In view of the shortcomings of the prior art, the primary object of the present invention is to provide a sliding seat of a lifting rod.

In order to achieve the above object, the solution of the present invention is described below.

A sliding seat of a lifting rod comprises a main body, a movable member, a friction block, an elastic member, and a knob having a handle. The main body has a receiving trough for retaining a shower head, a receiving hole for receiving the lifting rod, and a through passage extending along a radial direction of the receiving hole. The friction block is fitted at one end of the through passage close to the receiving hole and abuts against a side wall of the lifting rod. The movable member is movable along the radial direction of the receiving hole and fitted at another end of the through passage. The elastic member is fitted between the movable member and the friction block. The knob is rotatably fitted on the main body to movably cooperate with the movable member. A push structure is provided between the knob and the movable member.

Preferably, a friction between the friction block and the lifting rod is greater than a gravity of the sliding seat of the lifting rod.

Preferably, the main body includes a fixing bracket and a shower head seat fitted on the fixing bracket. The shower head socket is provided with the receiving trough. One end of the fixing bracket is formed with an annular circumferential wall and a central post. The central post is located at a center of the annular circumferential wall. An annular groove is formed between the central post and the annular circumferential wall. The fixing bracket is formed with a through hole passing through the fixing bracket and communicating with the annular groove. The through passage includes the annular groove and the through hole. The knob includes an annular side wall and an annular bottom wall. An outer edge of the annular bottom wall is connected to the annular side wall. The handle is connected with the annular side wall. The central post passes through a central hole of the annular bottom wall. The annular side wall is disposed on the annular circumferential wall. The movable member is movably fitted on the central post and abuts against the annular bottom wall. The friction block is fitted on the central post and formed with a protruding portion passing through the through hole. The protruding portion abuts against the side wall of the lifting rod. The elastic member is fitted in the annular groove and located between the movable member and the friction block.

Preferably, another end of the fixing bracket is formed with the receiving hole, and the through hole communicates with the receiving hole.

Preferably, the main body further includes a roller. Another end of the fixing bracket is formed with a U-shaped opening. The through hole communicates with the U-shaped opening. The roller is rotatably connected to the U-shaped opening and cooperates with the U-shaped opening to form the receiving hole.

Preferably, the roller is fitted with a sleeve covering the roller.

Preferably, the push structure includes a protrusion formed on the annular bottom wall and a groove formed on the movable member for the protrusion to movably engage with the groove.

Preferably, the annular circumferential wall is formed with a notch. A side wall of the movable member is formed with a protruding post to be engaged in the notch.

Preferably, the central post is formed with a nut portion. The shower head seat has a perforation. A screw is inserted through the perforation and screwed to the nut portion. The knob is located between the shower head seat and the fixing bracket.

Preferably, a washer is provided between a head of the screw and the shower head seat, and another washer is provided between the shower head seat and the knob.

Preferably, the elastic member is a spring sleeved on the central post, and two ends of the spring abut against the movable member and the friction block, respectively.

Preferably, the movable member is provided with an annular engaging groove for one end of the spring to be fitted, and the friction block is provided with an annular fitting groove for the other end of the spring to be fitted.

Alternatively, the elastic member is an elastic rib having two ends connected with the movable member and the friction block respectively.

With the above solution, the present invention has the following advantages:

In the present invention, when the knob is rotated, the movable member is moved by the push structure and the elastic member, thereby changing the distance between the movable member and the friction block to change the friction between the friction block and the lifting rod, so that the present invention can be fixed on the lifting rod or moved relative to the lifting rod. Because the knob has the handle, its arm is longer so that the knob needs less force to rotate. Because the elastic member is arranged between the movable member and the friction block, a certain friction is always maintained between the friction block and the lifting rod, so that the present invention can be temporarily fixed on the lifting rod, which is convenient for the user to adjust the position of the present invention on the lifting rod.

DETAILED DESCRIPTION OF THE PREFERRED EMBODIMENTS

Figure 1:
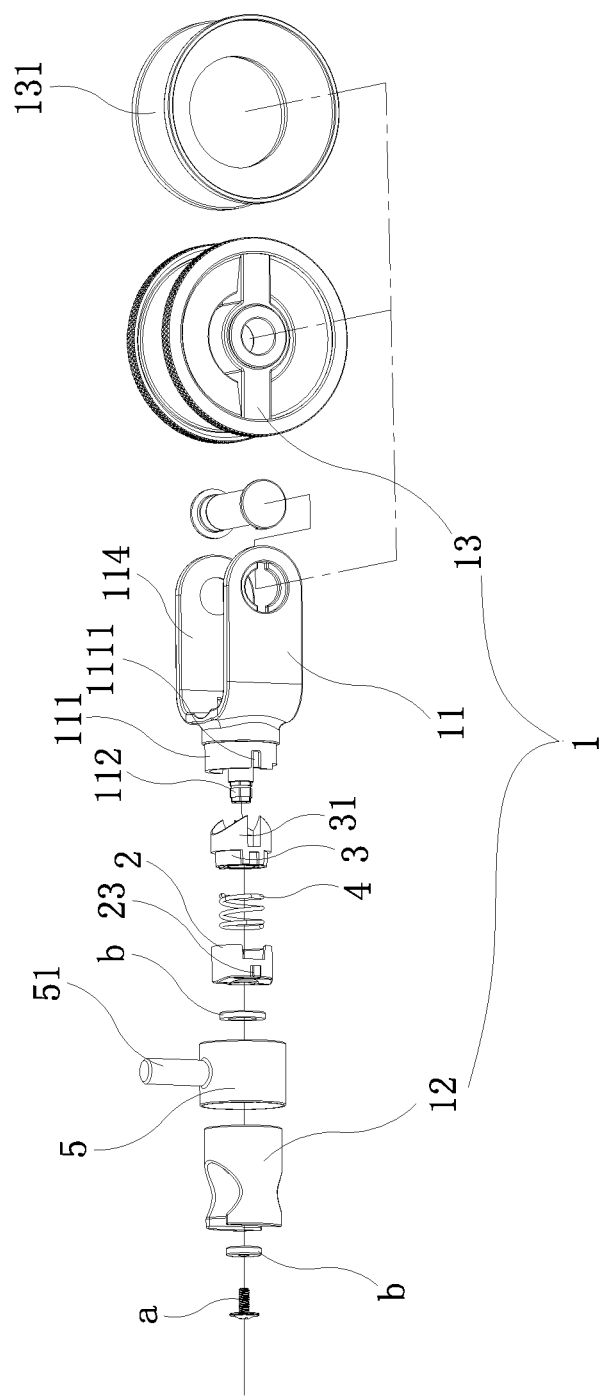
FIG. 1 is an exploded view of the present invention.
Figure 2:
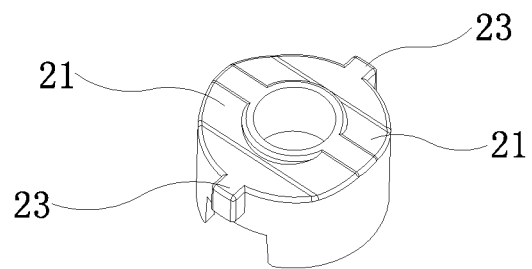
FIG. 2 is a perspective view of the movable member of the present invention.
Figure 3:
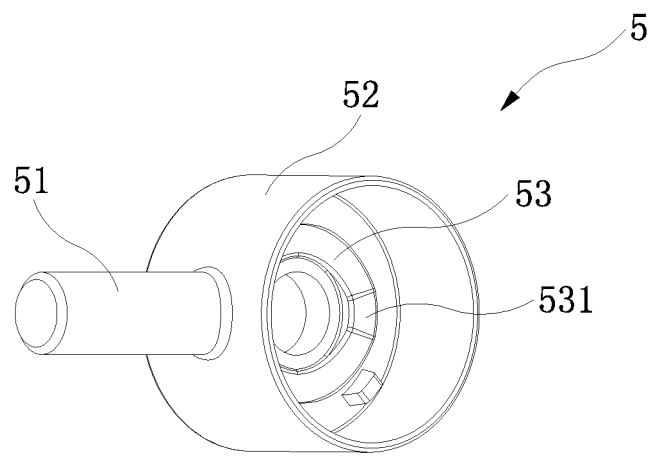
FIG. 3 is a perspective view of the knob of the present invention.

Embodiments of the present invention will now be described, by way of example only, with reference to the accompanying drawings.

With reference to FIG. 1 to FIG. 6, the present invention discloses a sliding seat of a lifting rod, comprising a main body 1, a movable member 2, a friction block 3, an elastic member 4, and a knob 5 having a handle 51. The main body 1 has a receiving trough 121 for retaining a shower head, a receiving hole 115 for receiving a lifting rod A, and a through passage 113 extending along a radial direction of the receiving hole 115. The friction block 3 is fitted at one end of the through passage 113 close to the receiving hole 115 and abuts against the side wall of the lifting rod A. The movable member 2 is movable along the radial direction of the receiving hole 115 and fitted at another end of the through passage 113. The elastic member 4 is fitted between the movable member 2 and the friction block 3. The knob 5 is rotatably fitted on the main body 1 to movably cooperate with the movable member 2. A push structure is provided between the knob 5 and the movable member 2. When the knob 5 is rotated, the movable member 2 is moved by the push structure and the elastic member 4 to change the distance between the movable member 2 and the friction pad 3, thereby changing the friction between the friction block 3 and the lifting rod A.

Specifically, the main body 1 includes a fixing bracket 11, a shower head seat 12 and a roller 13 fitted on the fixing bracket 11. The shower head socket 12 is provided with the receiving trough 121. One end of the fixing bracket 11 is formed with an annular circumferential wall 111 and a central post 112. The central post 112 is located at the center of the annular circumferential wall 111. An annular groove 1131 is formed between the central post and the annular circumferential wall 111. The fixing bracket 11 is formed with a through hole 1132 passing through the fixing bracket 11 and communicating with the annular groove 1131. The through passage 113 includes the annular groove 1131 and the through hole 1132. Another end of the fixing bracket 11 is formed with a U-shaped opening 114. The through hole 1132 communicates with the U-shaped opening 114. The roller 13 is rotatably connected to the U-shaped opening 114 and cooperates with the U-shaped opening 114 to form the receiving hole 115. The roller 13 is fitted with a sleeve 131 covering the roller 13 to prevent the roller 13 from damaging the lifting rod A when rolling on the lifting rod A. It should be noted that the main body 1 is not limited to include the roller 13. The purpose of the roller 13 is to facilitate the movement of the present invention on the lifting rod A. Therefore, the main body 1 may include the fixing bracket 11 and the shower head seat 12 only. The other end of the fixing bracket 11 is directly formed with the receiving hole 115. The through hole 1132 communicates with the receiving hole 115.

As shown in FIG. 3 to FIG. 6, the knob 5 includes an annular side wall 52 and an annular bottom wall 53. An outer edge of the annular bottom wall 53 is connected to the annular side wall 52. The central post 112 passes through a central hole of the annular bottom wall 53. The annular side wall 52 is disposed on the annular circumferential wall 111. The handle 51 is connected with the annular side wall 52 to facilitate the user to rotate the knob 5 with less operation force.

Figure 4:
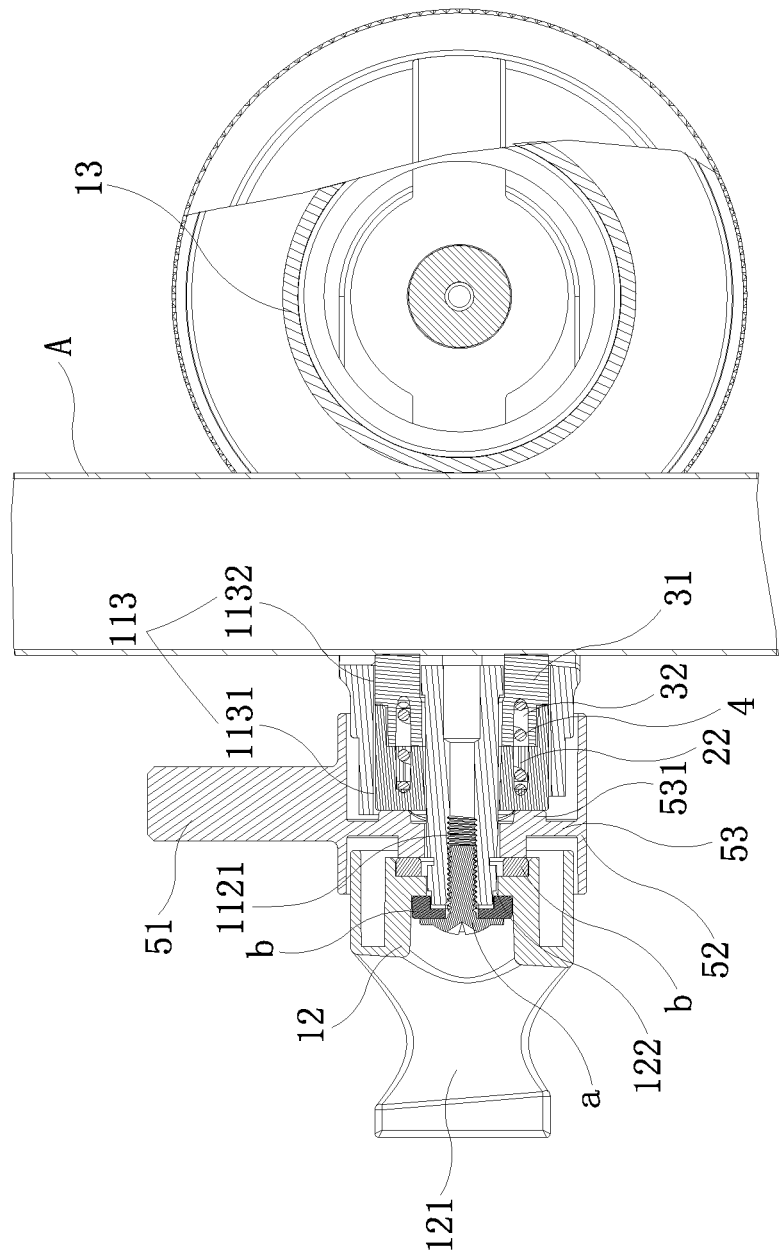
FIG. 4 is a first cross-sectional view of the present invention fitted on the lifting rod (in a stably fixed state)
Figure 5:
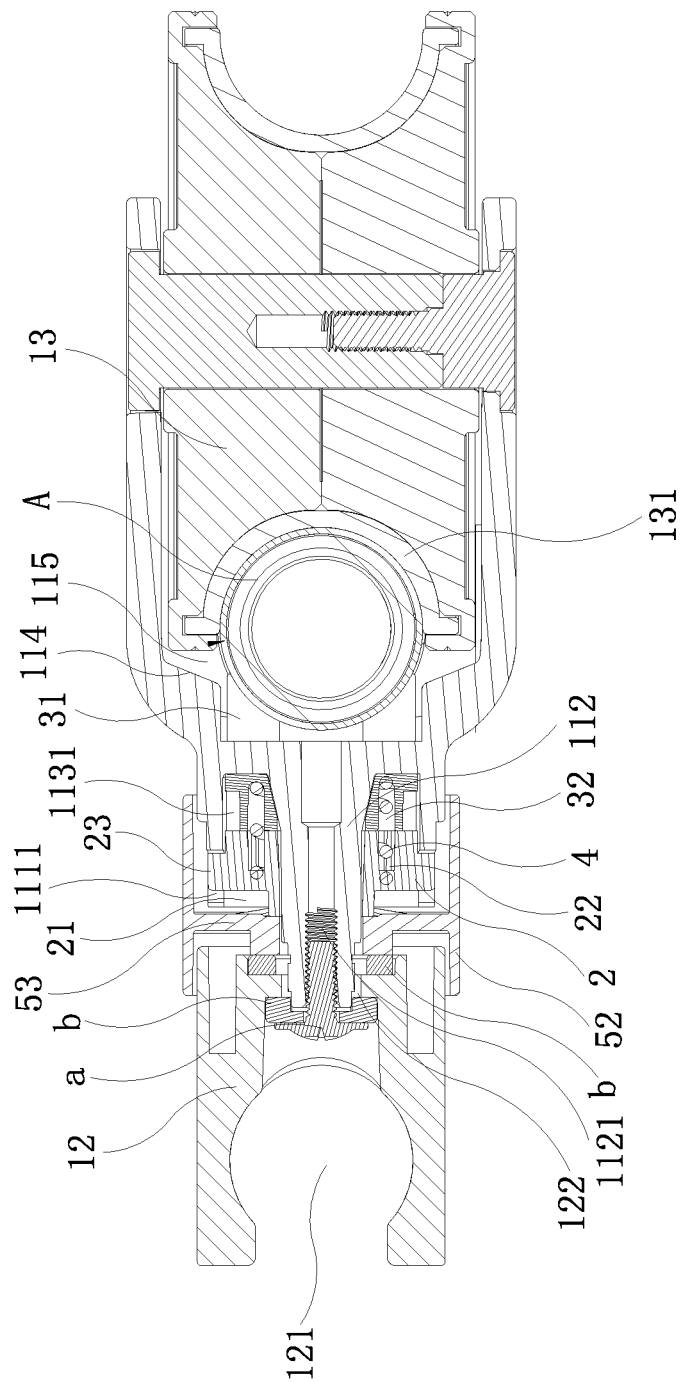
FIG. 5 is a second cross-sectional view of the present invention fitted on the lifting rod (in a stably fixed state)
Figure 6:
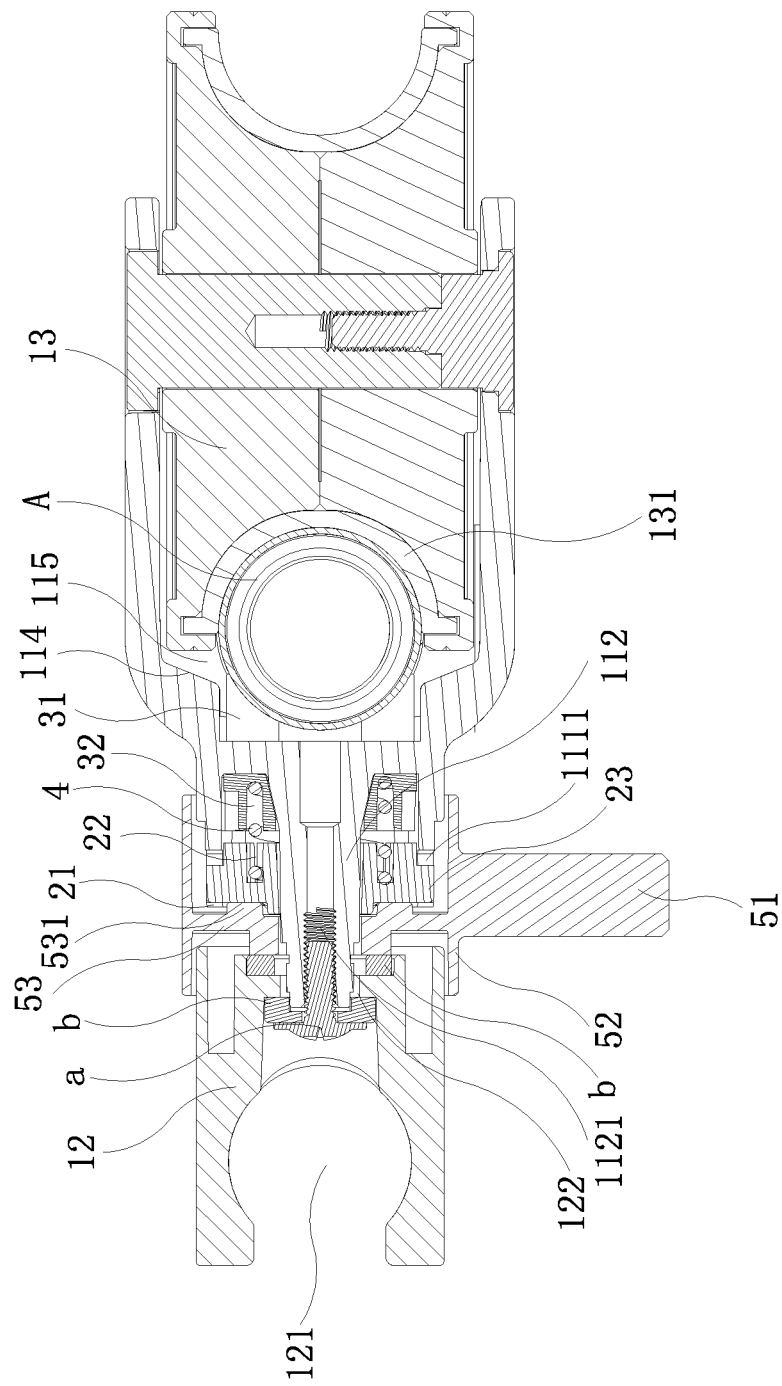
FIG. 6 is a third cross-sectional view of the present invention fitted on the lifting rod (in a temporarily fixed state).

As shown in FIG. 4 to FIG. 6, the central post 112 is formed with a nut portion 1121. The shower head seat 12 has a perforation 122. A screw a is inserted through the perforation 122 and screwed to the nut portion 1121 so that the shower head seat 12 is fixed to the central post 112 of the fixing bracket 11. The knob 5 is located between the shower head seat 12 and the fixing bracket 11 to prevent the knob 5 from falling off. A washer b is provided between the head of the screw a and the shower head seat 12 to fix the shower head seat 12 stably. A washer b may also be provided between the shower head seat 12 and the knob 5 to facilitate rotation of the knob 5. The shower head seat 12 is not limited to be fixed to the central post 112. The shower head seat 12 may be fixed on the side of the fixing bracket 11 by snapping or welding.

The movable member 2 is movably fitted on the central post 112 and abuts against the annular bottom wall 53. The push structure includes a protrusion 531 formed on the annular bottom wall 53 and a groove 21 formed on the movable member 2 for the protrusion 531 to movably engage with the groove 21. By turning the knob 5, the protrusion 531 can be engaged with the groove 21, or the protrusion 531 can be disengaged from the groove 21. The friction block 3 is fitted on the central post 112 and formed with a protruding portion 31 passing through the through hole 1132. The protruding portion 31 abuts against the side wall of the lifting rod A. The elastic member 4 is fitted in the annular groove 1131 and located between the movable member 2 and the friction block 3. With reference to FIG. 4 to FIG. 6, the elastic member 4 may be a spring sleeved on the central post 112. Two ends of the spring abut against the movable member 2 and the friction block 3, respectively. The movable member 2 may be provided with an annular engaging groove 22 for one end of the spring to be fitted. The friction block 3 may be provided with an annular fitting groove 32 for the other end of the spring to be fitted. Through the annular engaging groove 22 and the annular fitting groove 32, the spring won't be displaced. The elastic member 4 is not limited to the spring. The elastic member 4 may be an elastic rib having two ends connected with the movable member 2 and the friction block 3 respectively.

Furthermore, the annular circumferential wall 111 is formed with a notch 1111. The side wall of the movable member 2 is formed with a protruding post 23 to be engaged in the notch 1111. By the cooperation of the protruding post 23 and the notch 1111, the movable member 2 won't be driven by the knob 5 to rotate.

In order to facilitate the understanding of the present invention, the working principle of the present invention will be specifically described below.

As shown in FIG. 4 and FIG. 5, when the knob 5 is rotated to disengage the projection 531 from the groove 21, the annular bottom wall 53 of the knob 5 will push the movable member 2, so that the movable member 2 is moved toward the friction block 3 to compress the elastic member 4, thereby increasing the pressure of the elastic member 4 against the friction block 3 so that the friction between the friction block 3 and the lifting rod A is increased. At this time, the present invention is fixed on the lifting rod A stably, and the user cannot push the present invention to move on the lifting rod A.

With reference to FIG. 6, when the knob 5 is rotated for the projection 531 to be engaged in the groove 21, the annular bottom wall 53 of the knob 5 will release the movable member 2, so that the movable member 2 biased by the elastic member 4 is moved away from the friction block 3. The elastic member 4 is restored to reduce the pressure of the elastic member 4 against the friction block 3 so that the friction between the friction block 3 and the lifting rod A is reduced. By controlling the minimum pressure of the elastic member 4 against the friction block 3, the minimum friction between the friction block 3 and the lifting rod A is greater than the gravity of the present invention, so that the present invention can be temporarily fixed on the lifting rod A. The user can push the present invention to move on the lifting rod A to adjust the position of the present invention on the lifting rod A. When the user pushes the present invention to a desired position, the user releases the grip on the present invention, and the present invention is temporarily fixed on the lifting rod A. The user simply rotates the knob 5 to disengage the protrusion 531 from the groove 21, so that the present invention can be fixed at the desired position of the lifting rod A stably, facilitating the user to adjust the position of the present invention on the lifting rod A.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A sliding seat of a lifting rod, comprising a main body, a movable member, a friction block, an elastic member, and a knob having a handle; the main body having a receiving trough for retaining a shower head, a receiving hole for receiving the lifting rod, and a through passage extending along a radial direction of the receiving hole; the friction block being fitted at one end of the through passage close to the receiving hole and abutting against a side wall of the lifting rod, the movable member being movable along the radial direction of the receiving hole and fitted at another end of the through passage; the elastic member being fitted between the movable member and the friction block, the knob being rotatably fitted on the main body to movably cooperate with the movable member, a push structure being provided between the knob and the movable member; wherein the main body includes a fixing bracket and a shower head seat fitted on the fixing bracket;

the shower head seat is provided with the receiving trough; one end of the fixing bracket is formed with an annular circumferential wall and a central post, the central post is located at a center of the annular circumferential wall, an annular groove is formed between the central post and the annular circumferential wall, the fixing bracket is formed with a through hole passing through the fixing bracket and communicating with the annular groove, the through passage includes the annular groove and the through hole;

the knob includes an annular side wall and an annular bottom wall, an outer edge of the annular bottom wall is connected to the annular side wall, the handle is connected with the annular side wall, the central post passes through a central hole of the annular bottom wall, and the annular side wall is disposed on the annular circumferential wall;

the movable member is movably fitted on the central post and abuts against the annular bottom wall; the friction block is fitted on the central post and formed with a protruding portion passing through the through hole, the protruding portion abuts against the side wall of the lifting rod, and the elastic member is fitted in the annular groove and located between the movable member and the friction block.

2. The sliding seat of the lifting rod as claimed in claim 1, wherein a friction between the friction block and the lifting rod is greater than a gravity of the sliding seat of the lifting rod.

3. The sliding seat of the lifting rod as claimed in claim 1, wherein another end of the fixing bracket is formed with the receiving hole, and the through hole communicates with the receiving hole.

4. The sliding seat of the lifting rod as claimed in claim 1, wherein the main body further includes a roller, another end of the fixing bracket is formed with a U-shaped opening; the through hole communicates with the U-shaped opening, and the roller is rotatably connected to the U-shaped opening and cooperates with the U-shaped opening to form the receiving hole.

5. The sliding seat of the lifting rod as claimed in claim 4, wherein the roller is fitted with a sleeve covering the roller.

6. The sliding seat of the lifting rod as claimed in any one of claims 1, 2, 3-5, wherein the push structure includes a protrusion formed on the annular bottom wall and a groove formed on the movable member for the protrusion to movably engage with the groove.

7. The sliding seat of the lifting rod as claimed in any one of claims 1, 2, 3-5, wherein the annular circumferential wall is formed with a notch, a side wall of the movable member is formed with a protruding post to be engaged in the notch.

8. The sliding seat of the lifting rod as claimed in any one of claims 1, 2, 3-5, wherein the central post is formed with a nut portion, the shower head seat has a perforation, a screw is inserted through the perforation and screwed to the nut portion, and the knob is located between the shower head seat and the fixing bracket.

9. The sliding seat of the lifting rod as claimed in claim 8, wherein a washer is provided between a head of the screw and the shower head seat, and another washer is provided between the shower head seat and the knob.

10. The sliding seat of the lifting rod as claimed in claim 1, wherein the elastic member is a spring sleeved on the central post, and two ends of the spring abut against the movable member and the friction block, respectively.

11. The sliding seat of the lifting rod as claimed in claim 10, wherein the movable member is provided with an annular engaging groove for one end of the spring to be fitted, and the friction block is provided with an annular fitting groove for the other end of the spring to be fitted.

12. The sliding seat of the lifting rod as claimed in claim 1, wherein the elastic member is an elastic rib having two ends connected with the movable member and the friction block respectively.

* * * * *